No. 775,159. Patented November 15, 1904.

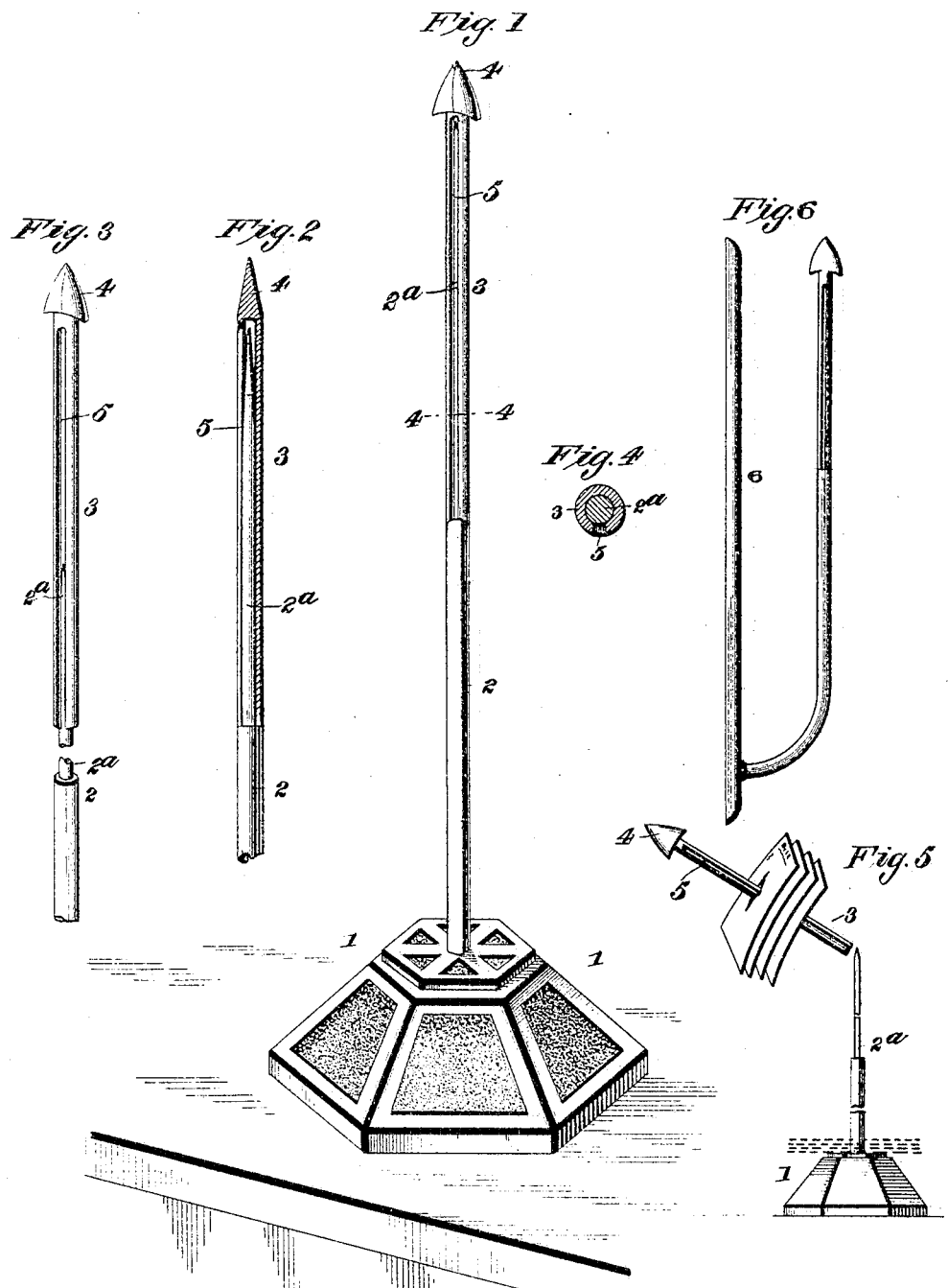

UNITED STATES PATENT OFFICE.

JOHN P. WOMBLE, OF NEWPORT NEWS, VIRGINIA.

BILL-FILE.

SPECIFICATION forming part of Letters Patent No. 775,159, dated November 15, 1904.

Application filed June 28, 1904. Serial No. 214,479. (No model.)

*To all whom it may concern:*

Be it known that I, JOHN P. WOMBLE, a citizen of the United States, residing at Newport News, in the county of Warwick and State of Virginia, have made an Improved Bill-File, of which the following is a specification.

My invention is an improvement in that class of bill-files which comprise a pointed pin, a supporting-base therefor, and a tube adapted to slide on the pin and extending the whole length of the same and serving to receive and hold bills and other papers which are removed with it when it is desired to examine them for the purpose of detaching one or more.

My invention embodies an improvement in the relative construction of the pin and detachable tube whereby important advantages are obtained, as hereinafter set forth.

The details of construction, arrangement, and combination of parts are as hereinafter described and claimed, reference being had to the accompanying drawings, in which—

Figure 1 is a perspective view of my improved bill-file. Fig. 2 is a longitudinal section of the upper portion of the same. Fig. 3 is a view illustrating the adjustment of the tube on the pin. Fig. 4 is an enlarged cross-section on the line 4 4 of Fig. 1. Fig. 5 is a view illustrating the practical use of the bill-file. Fig. 6 is a side view showing a modification.

I will first describe the invention as illustrated in Figs. 1 to 5. The numeral 1 indicates a truncated pyramidal base adapted to be supported upon any flat surface, and 2 $2^a$ a pointed pin which is set and fixed in said base and made of suitable length to receive and hold the bills or other papers which are to be filed.

3 indicates a tube which is made of spring or elastic material, the same being provided with an enlarged piercing-head 4 and a longitudinal slot 5, which is open at the lower end. The tube is made of such diameter that it will receive the pin $2^a$, but clasp the same with considerable friction, so that it will retain its hold on the latter except when forcibly adjusted or disengaged. The lower portion 2 of the pin is made of the same diameter as the tube 3, and the upper half $2^a$ of the pin is reduced in diameter and tapered to adapt it to be introduced into the tube. The lower end of the latter abuts a shoulder, as shown. In other bill-files of this class it has been usual, as before intimated, to make the slidable tube of the same length as the free portion of the pointed pin. I have found, however, that an important advantage may be obtained by making the tube of considerably less length, preferably about half the length of the pin, so that due space is provided between the tube and the base 1 to hold a large number of bills or other papers. When it is desired to remove one of the bills which may be located below the top one, the operation is as follows: The bills which lie above the one to be removed are pushed upward or slipped upon the tube 3 and the latter is then detached, as indicated in Fig. 5, whereupon the particular bill desired may be slipped off from the pin and the tube with the other bills again set on the pin as before. It will be seen that this operation does not disturb the relative arrangement of the bills, but provides for readily and conveniently removing any one of them. The bills which are moved upward upon the tube are prevented from slipping off the same by means of the enlarged pointed head 4.

The elastic tube clamps the pin 2 with sufficient friction to enable the tube to support itself in any vertical adjustment, as illustrated in Fig. 3, where the tube is shown partly drawn off the pin. Thus the bill-file is adapted to accomodate a very large number of bills, since the latter may be applied to the device until they reach the head 4 of the tube. It will be understood, however, that this will be an unusual occurrence. It will be further seen that this adaptation of the tube 3 to retain its grip on the pin so that it may be set at different heights enables me to make the pin shorter than is practicable in that class of bill-files in which the slidable tube extends the entire length of the free portion of the pin, and, what is more important, owing to the friction grip or hold of the tube on the pin the whole device may be lifted by seizing the tube, since it will not slide off except by the application of considerable force. It will be further noted that the upper part $2^a$ of the pin being pointed it is adapted to pierce bills and other papers, so that they may be placed on the pin after tube 3 has been detached. This is often a great convenience, since papers of the same kind or such as are indorsed with names having initials that are the same or belong in the same group may be placed and kept together on the lower part 2, while others may be kept on the tube 3.

In Fig. 6 I illustrate a modification in which a tube is applied to a pin whose curved lower end is secured to a wall-bracket 6, the tube and the main portion of the pin being parallel to the latter.

What I claim is—

The bill-file comprising a base, a pin set in said base and having a shoulder located about midway of its length, the portion above said shoulder being reduced and pointed, and the pointed detachable and split tube adapted to fit closely upon the reduced portion of the pin, and having exteriorly the same diameter as the lower half of the pin, as shown and described.

JOHN P. WOMBLE.

Witnesses:
W. W. WASHBURN,
C. R. HOSKINS.